United States Patent Office 2,937,184
Patented May 17, 1960

2,937,184

PREPARATION OF HYDANTOINS FROM HYDROZONES

James N. Coker and Melvin Fields, Wilmington, Del., and Arthur O. Rogers, Lewiston, N.Y., assignors to E. I. du Pont de Nemours and Company, Wilmington, Del., a corporation of Delaware No Drawing. Application September 17, 1957
Serial No. 684,416

10 Claims. (Cl. 260—309.5)

This invention relates to the preparation of hydantoins, and is more particularly concerned with the conversion of hydrazones to hydantoins.

It is known that aldehydes and ketones can be converted to hydantoins with ammonium carbonate and cyanides, and that the resulting hydantoins can readily be hydrolyzed to form valuable amino acids. Suitable methods are disclosed in the publications, H. T. Bucherer et al., "Uber die Bildung substituierter Hydantoine aus Aldehyden und Ketonen," J. Prakt. Chem., 141, 5–43 (1934), and W. Gebhardt, "Uber Hydantoine, Thiohydantoine, Sulfothiazolidon- und Sulfothiazolidoniminderivate," diss. Technischen Hochschule Munchen, 38 pages (1935). However, the preparation and isolation of aldehyde or ketone starting materials of suitable stability and reactivity for the conversion has imposed serious practical limitations on the hydantoins and corresponding amino acids which can be prepared commercially.

It is an object of this invention to provide a more generally useful process for preparing hydantoins which does not depend upon isolation of aldehyde or ketone starting reactants. Other objects will become apparent from the specification and claims.

In accordance with this invention aldehyde or ketone hydrazones of the general formula

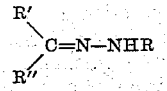

where

is a group corresponding to the aldehyde or ketone portion of the name and R is a stable substituent attached by carbon, e.g., carbamyl, thiocarbamyl, oxamyl, simple acyl and alkyl, aralkyl or aryl hydrocarbon radicals, are readily converted to hydantoins by reaction in a solution containing ammonium ions, carbon dioxide or carbonate ions and cyanide ions. The reaction mechanism is not understood, but the overall result is as follows:

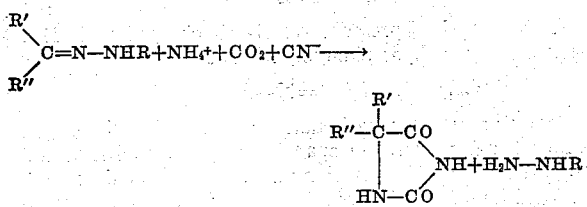

The starting material in the above reaction is a ketone hydrazone when R' and R" represent alkyl, aralkyl or aryl substituents, and is an aldehyde hydrazone when one of R' and R" is hydrogen. The result of the reaction is surprising, particularly since these derivatives are relatively stable to hydrolysis.

Suitable starting materials in the process of this invention includes the aldehyde and ketone hydrazones wherein the above R' and R" are selected from the group consisting of hydrogen, hydrocarbon substituents, substituents containing oxygen, hydrolytically stable halogen, nitrogen or sulfur in an otherwise hydrocarbon group, and substituents wherein R' and R" are joined to form an alicyclic ring of 5 to 6 carbon atoms which includes the alkylidene carbon of the above formula. Included are alkyl, aralkyl and aryl substituent groups and such groups having a hydroxyl, lower alkoxy, lower acyl or halogen substituent on a carbon atom, also heterocyclic substituents containing a single heteroatom of oxygen, nitrogen or sulfur in a heterocyclic ring.

In the process of this invention the hydrazone, preferably an aldehyde or ketone semicarbazone, thiosemicarbazone, alkylhydrazone or arylhydrazone, is heated in an inert polar solvent, preferably water or a lower alcohol or a mixture thereof, containing ammonium ions, carbonate ions and cyanide ions. Ammonium carbonate and hydrogen cyanide are the most convenient sources of the required ions, but other materials can obviously be used to form these ions in solution. Thus carbon dioxide and ammonia or various ammonium salts can be added separately, in place of ammonium carbonate, and metal cyanides can be used in place of hydrogen cyanide. Solid carbon dioxide can be added to increase the concentration of carbon dioxide in solution. The addition of a small amount of sodium hydrogen sulfite or other bisulfite will usually increase the yield, but is not essential. The yield may also be improved by complete exclusion of oxygen from the reaction. A reaction temperature of about 40° C. to about 220° C. is suitable, with pressure being required at the higher temperatures. The optimum reaction temperature is 100° to 150° C. At about 100° C. the reaction is usually complete in about 3 to 4 hours. The relatively insoluble hydantoin product can be separated from the reaction mixture by filtration. The yield can frequently be improved by concentrating the filtrate or salting out soluble product with neutral salts, e.g., sodium sulfate. The hydantoin is purified by recrystallization from water or other solvent.

Preferred process conditions will be shown in the examples, which illustrate specific embodiments of the invention. Parts refers to parts by weight.

EXAMPLE I

A pressure reactor was charged with 4.5 parts n-butyraldehyde semicarbazone.

and a solution of 5.5 parts ammonium carbonate and 1.5 parts hydrogen cyanide in 35 parts water. The reactor was closed and heated 4 hours at 100° C. Upon cooling the reaction mixture a crystalline precipitate formed. Filtration recovered 1.5 parts product melting at 127°–132° C. Recrystallization from water raised the melting point to 133°–135° C. (uncor.). The distinctive melting point identified the product as 5-n-propyl hydantoin, a known compound.

*Analysis.*—Calculated: C, 50.6; H, 7.04; N, 19.7. Found: C, 50.68; H, 6.88; N, 19.85.

A second crop of 0.8 part of crude product was recovered by partially evaporating the original mother liquor, giving a total recovery of 46.5%.

The n-butyraldehyde semicarbazone used in the above example may be prepared by charging an autoclave with 8 parts n-butyronitrile, 21 parts semicarbazide hydrochloride, 15 parts sodium acetate, 5 parts Raney nickel catalyst, 100 parts water and hydrogen at 100 atmospheres pressure. After 3 hours at room temperature the reaction mixture is filtered and the filtrate is partially evaporated to crystallize out the butyraldehyde semicarbazone product. The product is purified by recrystallization from water to give a melting point of 95.5° C.

EXAMPLE II

A pressure reactor was charged with 10 parts 3-indoleacetaldehyde semicarbazone, 7.5 parts ammonium carbonate and 70 parts water. The reactor was flushed with nitrogen and then 1.5 parts of hydrogen cyanide was introduced. The reactor was closed and heated at 100° C. for 4 hours. The reaction mixture was then cooled to 0°–5° C. and the white precipitate formed was separated by filtration. This product was recrystallized from water to give 7.0 parts of product melting at 216.5°–217.0° C. It was identified as being the known compound, 5-(3-indolylmethyl)-hydantoin, by elemental analysis, infrared analysis and paper chromatographic analysis. Therefore the reaction gave a 65% yield of the 5-(3-indolylmethyl)-hydantoin represented by the structural formula,

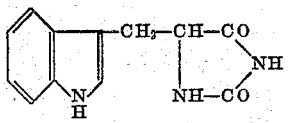

*Analysis.*—Calculated: C, 62.88; H, 4.80; N, 18.37. Found: C, 62.88; H, 5.10; N, 18.25, 18.51.

The hydantoin exhibited an X-ray diffraction pattern identical with that obtained with an authentic sample of the compound. It was readily hydrolyzed to form DL-tryptophan,

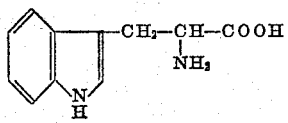

One part of 5-(3-indolylmethyl)-hydantoin and 14 parts of an aqueous solution containing a 4% concentration of sodium hydroxide were heated under pressure at 150° C. for 30 minutes. The reaction mixture was neutralized with acid and the precipitated DL-tryptophan was separated by filtration, washed and dried. The melting point of 283° C. corresponded to the known melting point for substantially pure DL-tryptophan.

Semicarbazide is formed along with 5-(3-indolylmethyl)-hydantoin and can be recovered as semicarbazide hydrochloride for use in forming the semicarbazone starting material. The solutions remaining after recovery of the hydantoin were evaporated to dryness under reduced pressure, below 37° C., to remove unreacted hydrogen cyanide and ammonium carbonate. The residue was extracted with 45 parts of distilled water at 0° C. The aqueous solution was evaporated to dryness, leaving a light brown resin. This resin was extracted with a total of 30 parts of absolute ethanol. The addition of anhydrous hydrogen chloride to this extract precipitated 3.3 parts of crude semicarbazide hydrochloride, corresponding to 63.4% recovery of the semicarbazide used in the starting material. Recrystallization of this crude product from aqueous ethanol gave a product melting at 170°–173° C. when heated rapidly, which agrees with authentic samples of semicarbazide hydrochloride. The product was used to prepare semicarbazones of benzaldehyde and cyclohexanone which were verified by melting point and mixed melting points with authentic samples of the semicarbazones.

The 3-indoleacetaldehyde semicarbazone used as a starting material in Example II has been prepared as described in Example 3 of Plieninger, German application Serial No. K 24529, printed August 2, 1956 (Klausse 1207.03), 2 pages specification. The crystalline 3-indoleacetaldehyde semicarbazone was found to have a melting point of 175.5°–176.0° C. The identity of the compound was verified by spectral and infrared data and by the following elemental analysis:

Calculated: C, 61.09; H, 5.59; N, 25.92. Found: C, 60.68; H, 5.52; N, 25.98, 25.48.

This product is believed to exist in two geometrical isomeric forms (presumably syn and anti forms), because it could be separated into a crystalline form melting at about 188° C. and a crystalline form melting at about 152° C. which is converted to the higher melting form by heat. Since either can be used as the starting material in Example II, it is not necessary to separate the two forms from the mixture ordinarily obtained.

EXAMPLE III

A reaction mixture was prepared by adding, to an appropriately sized pressure vessel, 6.5 parts benzaldehyde semicarbazone, 5.5 parts ammonium carbonate, 0.7 part liquid hydrogen cyanide, 1 part sodium acid sulfite, 80 parts methanol and 20 parts water. The mixture was heated at 100° C. for 4 hours. The solvent was evaporated and 2 parts of 5-phenylhydantoin, having a melting point of 183°–185° C., was recovered from the residue by extraction with alcohol and recrystallization. The melting point and the following elemental analysis identified the product as the monohydrate:

Calculated: C, 55.7; H, 4.1; N, 14.4. Found: C, 56.2; H, 4.7; N, 14.8.

The benzaldehyde semicarbazone starting material for Example III may be prepared as described in Example I of the previously referenced German application Serial No. K 24529.

EXAMPLE IV

A mixture of 10 parts cyclopentanone thiosemicarbazone, 11 parts ammonium carbonate, 1.5 parts hydrogen cyanide, 3.0 parts sodium bisulfite, 50 parts water and 50 parts ethanol was heated in a pressure vessel for 4 hours at 120° C. The reaction mixture was cooled and filtered to remove crystals of thiosemicarbazide, of which 2.6 parts melting at 181°–182° C. was recovered. The filtrate was evaporated to dryness under vacuum, leaving 9.6 parts of a crystalline mass. This mass was extracted with 100 parts of chloroform and the chloroform-insoluble residue was in turn extracted with 30 parts of hot ethanol. Upon cooling the ethanol, a first crop of 1.1 parts of crystals was obtained which melted at 207°–209° C. Partial evaporation of the ethanol yielded a second crop of 3 parts of crystals melting at 208°–210° C. The melting points and elemental analyses of both crops of crystals correspond to that of spiro [cyclopentane-1,5'-hydantoin], which is represented by the formula,

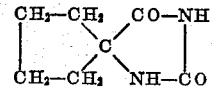

Calculated analysis: C, 54.5; H, 6.5; N, 18.2. Found (first crop): C, 54.4; H, 6.4; N, 18.2. Found (second crop): C, 54.9; H, 6.7; N, 18.4.

The cyclopentanone thiosemicarbazone starting material in Example IV may be prepared as described by Baird, Burns and Wilson, J. Chem. Soc., 1927, pages 25–27.

EXAMPLE V

A suitably sized pressure vessel was charged with 11.4 parts n-butyraldehyde phenylhydrazone

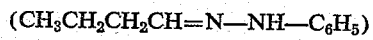

11 parts ammonium carbonate, 1 part sodium hydrogen sulfite, 3 parts hydrogen cyanide, 40 parts methanol and 40 parts water. The reaction mixture was heated at 100° C. for 6 hours and the volatile materials were then evaporated under partial vacuum. The residue, which was part oil and part crystalline solid, was filtered and the solid was copiously washed with ether to remove the oil. The solid was redissolved in methanol, the solution was evaporated to dryness, and the solid was again washed copiously with ether to yield 3.4 parts of yellow crystalline solid.

After recrystallization from water, a melting point of 135°–137° C. was obtained, which identified the product as 5-n-propyl hydantoin. It was further identified by taking the mixed melting point with an authentic sample of the compound.

The n-butyraldehyde phenylhydrazone used in the above example may be prepared as described in Huntress and Mulliken, "Identification of Pure Organic Compounds, Order I" (John Wiley and Sons, 1941).

EXAMPLE VI

A pressure reactor was charged with 7.8 parts 3-indoleacetaldehyde phenylhydrazone, 25.0 parts ammonium carbonate, 8.2 parts sodium bisulfite and 4.3 parts hydrogen cyanide in 350 parts distilled water and 5 parts methanol. The mixture was heated for 4 hours at 100° with shaking. The reaction mixture was cooled to 0–5° and discharged. The tube was rinsed with 100 parts methanol which was combined with the hydrogenation charge. The combined mixture was evaporated to dryness and the residue extracted with 50 parts water. 5-(3-Indolylmethyl)-hydantoin remained behind as an undissolved residue. After air-drying it amounted to 5.0 parts and melted at 214–217°. This material did not depress the melting point of an authentic sample of 5-(3-indolylmethyl)-hydantoin.

The 3-indoleacetaldehyde phenylhydrazone used in this experiment was prepared by the reaction of 3-indoleacetaldehyde with phenylhydrazine.

EXAMPLE VII

A pressure reactor was charged with 9.9 parts 1-acetyl-3-indoleacetaldehyde phenylhydrazone, 25.0 parts ammonium carbonate, 8.2 parts sodium bisulfite and 4.3 parts hydrogen cyanide in 350 parts distilled water and 5 parts methanol. The mixture was heated for 3.5 hours at 100° with shaking. The reaction mixture was cooled to 0–5° and discharged. The tube was rinsed with 130 parts methanol which was combined with the hydrogenated charge. The combined mixture was evaporated to dryness and the residue extracted with 60 parts water. 5-(3-indolylmethyl)-hydantoin remained behind as an undissolved residue. After air-drying it amounted to 5.5 parts and melted at 214–222° C. This material did not depress the melting point of an authentic sample of 5-(3-indolylmethyl)-hydantoin.

The 1 - acetyl - 3 - indoleacetaldehyde phenylhydrazone used in this experiment was prepared by the reaction of 1-acetyl-3-indoleacetaldehyde with phenylhydrazine.

EXAMPLE VIII

A pressure reactor was charged with 2.4 parts 1-acetyl-3-indoleacetaldehyde semicarbazone, 6.0 parts ammonium carbonate and 1.5 parts hydrogen cyanide in 60 parts water and heated at 100° for 4 hours with shaking. The reaction mixture was cooled to 0–5° C. and discharged. 5-(3-indolylmethyl)-hydantoin which has separated out was collected by suction filtration, washed with cold water and air-dried. It mounted to 1.3 parts and melted at 213–215° C. After a single recrystallization from methanol, the material melted at 220–221° C. and did not depress the melting point of an authentic sample of 5-(3-indolylmethyl)-hydantoin.

The 1-acetyl-3-indoleacetaldehyde semicarbazone used in this experiment was obtained by the treatment of 1-acetyl-3-indoleacetaldehyde with semicarbazide.

Example I has illustrated the formation of hydantoins from semicarbazones of the general formula

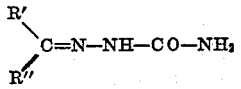

where R' is an alkyl group and R" is hydrogen or an alkyl group which is the same or different from that of R'. The procedure illustrated for n-butyraldehyde semicarbazone is suitable for any of these compounds. Thus n-propionaldehyde semicarbazone (M.P. 89° C.) can be substituted in Example I to give 5-ethyl hydantoin. Likewise acetone semicarbazone (M.P. 187° C.) can be substituted to give 5,5-dimethyl hydantoin and methyl ethyl ketone semicarbazone (M.P. 140° C.) can be substituted to give 5-methyl-5-ethyl hydantoin.

Example II has illustrated the formation of hydantoins from semicarbazones of the formula

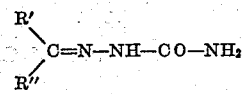

where R' is a group attached by carbon containing a single heteroatom of oxygen, nitrogen or sulfur in an otherwise hydrocarbon group, and R" is hydrogen or an alkyl group. As additional examples, instead of the 3-indoleacetaldehyde semicarbazone of Example II, furfural semicarbazone (M.P. 202° C.) can be substituted to give 5-α-furyl) hydantoin and 3-indolealdehyde semicarbazone can be substituted to give 5-(3-indole)-hydantoin.

Example III has illustrated the formation of hydantoins from semicarbazones of the formula

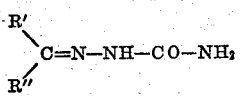

where R' is a hydrocarbon group containing an aromatic ring and R" is hydrogen or an alkyl group. As additional illustrations, α-tolualdehyde semicarbazone (M.P. 156° C.) can be substituted to give 5-benzyl hydantoin and acetophenone semicarbazone (M.P. 198° C.) can be substituted to give 5-methyl-5-phenyl hydantoin. Example IV has illustrated the reaction where R' of the above formula is an alicyclic hydrocarbon. Substitution of cyclohexanone semicarbazone (M.P. 166° C.) gives spiro [cyclohexane-1,5'-hydantoin] by the same procedure.

Example V has illustrated that the same reaction takes place when, instead of the carbamyl group of the above semicarbazones, other stable groups are present. Illustrations of such groups are aryl as in butyraldehyde phenyl hydrazone, alkyl as in benzaldehyde propyl hydrazone, acyl as in benzaldehyde acetyl hydrazone, and oxamyl as in indoleacetaldehyde semioxamizide.

The process of this invention is of particular importance in the formation of hydantoins for conversion to aminoacids as illustrated in Example II. A similar procedure can be used to prepare other aminoacids as set forth in the following table:

*Preparation of aminoacids*

| | Aldehyde Semicarbazone | Substituent on Hydantoin | Aminoacid by Hydrolysis |
|---|---|---|---|
| 1 | Formaldehyde | None | Glycine. |
| 2 | Acetaldehyde | $CH_3$— | Alanine. |
| 3 | 2-Hydroxypropionaldehyde (as acetic acid ester) | $CH_3CH(OCOCH_3)$— | Threonine. |
| 4 | iso-Valeraldehyde | $(CH_3)_2CHCH_2$— | Leucine. |
| 5 | 2-Methylbutraldehyde | $CH_3CH_2CH(CH_3)$— | Isoleucine. |
| 6 | Valeraldehyde | $CH_3CH_2CH_2CH_2$— | Norleucine. |
| 7 | iso-Butyraldehyde | $(CH_3)_2CH$— | Valine. |
| 8 | α-Tolualdehyde | ⟨⟩—$CH_2$— | Phenylalanine. |
| 9 | p-Hydroxy-α-tolualdehyde | HO—⟨⟩—$CH_2$— | Tyrosine. |
| 10 | 2-Hydroxyacetaldehyde | HO—$CH_2$— | Serine. |
| 11 | 3-Methylmercaptopropionaldehyde | $CH_3SCH_2CH_2$— | Methionine. |
| 12 | 4-Aminobutyraldehyde | $H_2N$—$CH_2CH_2CH_2$— | Ornithine. |
| 13 | 5-Aminovaleraldehyde | $H_2N$—$CH_2CH_2CH_2CH_2$— | Lysine. |

Since many different embodiments of the invention may be made without departing from the spirit and scope thereof, it is to be understood that the invention is not limited by the specific illustrations except to the extent defined in the following claims.

We claim:

1. The process for producing a hydantoin which comprises reacting a hydrazone, having a single hydrogen of the second nitrogen substituted by a stable substituent attached by carbon of the substituent, with ammonium ions, carbonate ions and cyanide ions in solution in an inert polar liquid solvent at 40° to 220° C.

2. The process for producing a hydantoin which comprises reacting an aldehyde hydrazone, having a single hydrogen of the second nitrogen substituted by a stable substituent attached by carbon of the substituent, with ammonium ions, carbonate ions and cyanide ions in solution in an inert polar liquid solvent at 40° to 220° C.

3. The process for producing a hydantoin which comprises reacting a ketone hydrazone, having a single hydrogen of the second nitrogen substituted by a stable substituent attached by carbon of the substituent, with ammonium ions, carbonate ions and cyanide ions in solution in an inert polar liquid solvent at 40° to 220° C.

4. The process of producing a hydantoin which comprises heating a reaction mixture of an aldehyde semicarbazone and a solution containing ammonium ions, carbonate ions and cyanide ions in an inert polar liquid solvent at 40° to 220° C., and recovering the hydantoin product.

5. The process for producing a hydantoin which comprises heating a reaction mixture of a ketone semicarbazone and a solution containing ammonium ions, carbonate ions and cyanide ions in an inert polar liquid solvent at 40° to 220° C., and recovering the hydantoin product.

6. The process for producing a hydantoin which comprises heating a reaction mixture of a hydrocarboncarboxaldehyde semicarbazone and a solution containing ammonium ions, carbonate ions and cyanide ions in an inert polar liquid solvent at 40° to 220° C., and recovering the hydantoin product.

7. The process for producing a hydantoin which comprises heating a reaction mixture of 3-indoleacetaldehyde semicarbazone and a solution containing ammonium ions, carbonate ions and cyanide ions in an inert polar liquid solvent at 40° to 220° C., and recovering the hydantoin product.

8. The process for producing a hydantoin which comprises heating a reaction mixture of an aralkanal semicarbazone and a solution containing ammonium ions, carbonate ions and cyanide ions in an inert polar liquid solvent at 40° to 220° C., and recovering the hydantoin product.

9. The process for producing a hydantoin which comprises heating a reaction mixture of a cycloalkanone semicarbazone and a solution containing ammonium ions, carbonate ions and cyanide ions in an inert polar liquid solvent at 40° to 220° C., and recovering the hydantoin product.

10. The process for producing a hydantoin which comprises heating a reaction mixture of a hydrocarboncarboxaldehyde phenylhydrazone and a solution containing ammonium ions, carbonate ions and cyanide ions in an inert polar liquid solvent at 40° to 220° C., and recovering the hydantoin product.

References Cited in the file of this patent

Plieninger et al.: Chem. Ber., vol. 89, p. 276 (1956).
Brown et al.: J. Chem. Soc., vol. 1952, pp. 3172–6.